(12) United States Patent
Liu et al.

(10) Patent No.: US 8,295,001 B2
(45) Date of Patent: Oct. 23, 2012

(54) SYSTEMS AND METHODS FOR LOW LATENCY NOISE CANCELLATION

(75) Inventors: Jingfeng Liu, Longmont, CO (US); Haotian Zhang, Longmont, CO (US); Hongwei Song, Longmont, CO (US); George Mathew, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 100 days.

(21) Appl. No.: 12/887,369

(22) Filed: Sep. 21, 2010

(65) Prior Publication Data

US 2012/0068752 A1    Mar. 22, 2012

(51) Int. Cl.
G11B 5/09 (2006.01)
G11B 27/36 (2006.01)
(52) U.S. Cl. ............... 360/46; 360/31; 360/39
(58) Field of Classification Search ............... None
See application file for complete search history.

(56) References Cited

U.S. PATENT DOCUMENTS

| | | |
|---|---|---|
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |

(Continued)

FOREIGN PATENT DOCUMENTS

EP    0522578    1/1993

(Continued)

OTHER PUBLICATIONS

U.S. Appl. No. 11/461,026, filed Jul. 31, 2006, Tan, Weijun.

(Continued)

*Primary Examiner* — Regina N Holder
(74) *Attorney, Agent, or Firm* — Hamilton, DeSanctis & Cha (57) ABSTRACT

Various embodiments of the present invention provide systems and methods for data processing. For example, a data processing circuit is discussed that includes a data detector circuit, a detector mimicking circuit, and an error calculation circuit. The data detector circuit is operable to perform a data detection process on a first signal derived from a data input to yield a detected output. The data mimicking circuit is operable to process a second signal derived from the data input to yield a mimicked output. The error calculation circuit is operable to calculate a difference between the second signal and a third signal derived from the mimicked output to yield a feedback signal. The feedback signal is operable to modify the data input during a subsequent period.

22 Claims, 6 Drawing Sheets

U.S. PATENT DOCUMENTS

| | | |
|---|---|---|
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Kawatani et al. |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman et al. |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,430,256 B2 | 9/2008 | Zhidkov |
| 7,502,187 B2 * | 3/2009 | Annampedu et al. ........... 360/53 |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghavan et al. |
| 7,702,989 B2 | 4/2010 | Graef et al. |
| 7,712,008 B2 | 5/2010 | Song et al. |
| 7,801,200 B2 | 9/2010 | Tan |
| 7,802,163 B2 | 9/2010 | Tan |
| 2003/0063405 A1 | 4/2003 | Jin et al. |
| 2003/0081693 A1 | 5/2003 | Raghavan et al. |
| 2003/0087634 A1 | 5/2003 | Raghavan et al. |
| 2003/0112896 A1 | 6/2003 | Raghavan et al. |
| 2003/0134607 A1 | 7/2003 | Raghavan et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0248435 A1 | 11/2006 | Haratsch |
| 2006/0256670 A1 | 11/2006 | Park et al. |
| 2007/0011569 A1 | 1/2007 | Vila Casado et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghavan et al. |
| 2010/0061492 A1 | 3/2010 | Noelder |
| 2010/0070837 A1 | 3/2010 | Xu et al. |
| 2010/0164764 A1 | 7/2010 | Nayak |
| 2010/0185914 A1 | 7/2010 | Tan et al. |
| 2010/0208574 A1 * | 8/2010 | Ratnakar Aravind et al. ............................ 369/134 |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2101, Liu, et al.
U.S. Appl. No. 12/887,330, filed Sep. 21, 2010, Zhang, et al.
U.S. Appl. No. 12/901,816, filed Oct. 11, 2010, Li et al.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/947,947, filed Nov. 17, 2010, Ivkovic et al.
U.S. Appl. No. 12/972,942, filed Dec. 20, 2010, Liao et al.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gunnam, K et al. "Tech. Note on Iterative LDPC Solutions for Turbo Equal.", K. Gunnam, G. Choi and M. Yeary, TX A&M Tech. Note, Rpt. Dt: Jul. 2006 Avail. online dropzone.tamu.edu.
K. Gunnam et al., "Next Generation iterative LDPC solutions for magnetic recording storage,"invited paper. The Asilomar Conference on Signals, Systems, and Computers, Nov. 2008.
Han and Ryan, "Pinning Techniques for Low-Floor Detection/Decoding of LDPC-Coded Partial Response Channels", 5th International Symposium on Turbo Codes &Related Topics, 2008.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Mohsenin et al., "Split Row: A Reduced Complexity, High Throughput LDPC Decoder Architecture", pp. 1-6, printed from www.ece.ucdavis.edu on Jul. 9, 2007.
Sari H et al., "Transmission Techniques for Digital Terrestrial TV Broadcasting" IEEE Communications Magazine, IEEE Service Center Ny, NY vol. 33, No. 2 Feb. 1995.
Unk, "Auto threshold and Auto Local Threshold" [online] [retr. May 28, 2010] Retr. from the Internet www.dentristy.bham.ac.uk/landinig/software/autothreshold/autothreshold.html.
Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Wang Y et al., "A Soft Decision Decoding Scheme for Wireless COFDM With App. to DVB-T" IEEE Transactions on Consumer elect., IEEE Service Center, NY,NY vo. 50, No. 1 Feb. 2004.

Weon-Cheol L. et al., "Vitierbi Decoding Method Using Channel State Information in COFDM System" IEEE Trans. on Consumer Elect., IEEE Service Center, NY, NY vol. 45 No. 3 Aug. 1999.

Yeo et al., "VLSI Architecture for Iterative Decoders in Magnetic Storage Channels", Mar. 2001, pp. 748-755, IEEE trans. Magnetics, vol. 37, No. 2.

Youn, "BER Perf. Due to Irreg. of Row-Weoght Distr. of the Parity-Check Matirx in Irregular LDPC Codes for 10-Gb/s Optical Signals" Journal of Lightwave Tech., vol. 23 Sep. 9, 2005.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

\* cited by examiner

Fig. 6

SYSTEMS AND METHODS FOR LOW LATENCY NOISE CANCELLATION

BACKGROUND OF THE INVENTION

The present inventions are related to systems and methods for data processing, and more particularly to systems and methods for low latency loop processing.

Various data processing circuits have been developed that include one or more loops. For example, a data processing circuit may receive a data signal that repeats at a defined frequency. In some cases, such loops are adjusting multiple modifiable parameters together. This can result in loop oscillation and/or improper loop operation.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for low latency loop processing.

Various embodiments of the present invention provide data processing circuits that include a data detector circuit, a detector mimicking circuit, and an error calculation circuit. The data detector circuit is operable to perform a data detection process on a first signal derived from a data input to yield a detected output. The data mimicking circuit is operable to process a second signal derived from the data input to yield a mimicked output. The error calculation circuit is operable to calculate a difference between the second signal and a third signal derived from the mimicked output to yield a feedback signal. The feedback signal is operable to modify the data input during a subsequent period. In some cases, the first signal and the second signal are the same signal. In various cases, the circuit further includes an analog to digital converter circuit and a digital filter. The analog to digital converter circuit is operable to convert the data input into a corresponding digital output. The digital filter is operable to filter the digital output and provide a filtered output. In such cases, the first signal is the filtered output, and the second signal may be either the digital output or the filtered output. In various instances of the aforementioned embodiments, the detector mimicking circuit includes circuitry to mitigate interference evident in a current bit that is related to at least one preceding bit in a bit stream.

In some instances of the aforementioned embodiments, the error calculation circuit includes a transition frequency filter circuit operable to reduce the value of the feedback signal when a transition frequency is greater than a threshold. In some such instances, the value of the feedback signal is reduced to zero. In other instances of the aforementioned embodiments, the error calculation circuit includes a transition frequency filter circuit operable to reduce the value of the feedback signal when the mimicked output matches a defined pattern. In some such instances, the value of the feedback signal is reduced to zero.

In some instances of the aforementioned embodiments, the detector mimicking circuit includes: a summation circuit, a comparator circuit, a delay circuit, and a multiplier circuit. The summation circuit is operable to sum the second signal with an interference value to yield a sum. The comparator circuit operable to receive the sum and to provide the mimicked output based at least in part on a value of the sum. The delay circuit is operable to delay the sum by a bit period to yield a delayed output. The multiplier circuit is operable to multiply the delayed output by an interference coefficient corresponding to a preceding bit period to yield the interference value.

Other embodiments of the present invention provide methods for lowering feedback latency in a low frequency data detection circuit. The methods include providing a data detector circuit; providing a detector mimicking circuit; receiving a data input; performing a data detection process using the data detector circuit on a first signal derived from the data input to yield a detected output; performing a detector mimicking process using the detector mimicking circuit on a second signal derived from the data input to yield a mimicked output; calculating an error value as a difference between the second signal and a third signal derived from the mimicked output; generating a feedback signal based at least in part on the error value; and applying the feedback signal to modify the data input. In some cases, the first signal and the second signal are the same signal. In various cases, the methods further include performing an analog to digital conversion on the data input to yield a digital output; and performing a digital filtering of the digital output to yield a filtered output. In such cases, the first signal is the filtered output, and the second signal may be either the digital output or the filtered output.

In one or more instances of the aforementioned embodiments, performing the detector mimicking process includes reducing interference evident in a current bit that is related to at least one preceding bit in a bit stream. In some instances of the aforementioned embodiments, the methods further include determining that a high frequency of transitions is evident in the mitigated output; and based at least in part on determining that a high frequency of transitions is evident in the mitigated output, reducing the error value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data processing, and more particularly to systems and methods for low latency loop processing.

Figure 1:
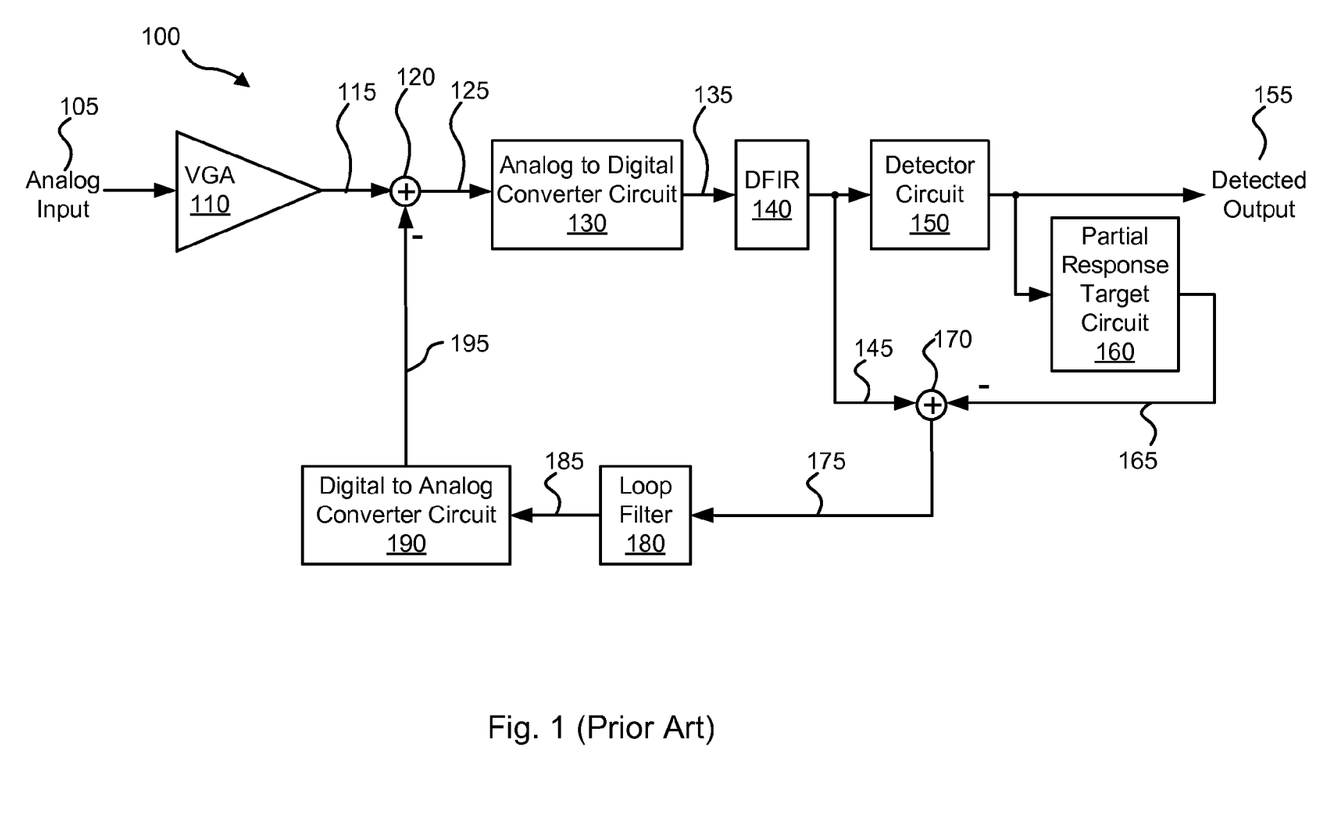
FIG. 1 depicts an existing loop circuit including low frequency noise correction feedback.

Turning to FIG. 1, an existing loop circuit 100 is shown that includes low frequency noise correction feedback. Loop circuit 100 includes a variable gain amplifier 110 that receives an analog input 105. Variable gain amplifier 110 amplifies analog input 105 to yield an amplified output 115 that is provided to a summation circuit 120. Summation circuit 120 subtracts a feedback signal 195 from amplified output 115 to yield a sum 125.

Sum 125 is provided to an analog to digital converter circuit 130 that converts the received signal into a series of digital samples 135 that are provided to a digital finite impulse response filter 140. Digital finite impulse response filter 140 filters the received input and provides a corresponding filtered output 145 to both a detector circuit 150 and a summation circuit 170. Detector circuit 170 performs a data detection process on the received input resulting in a detected output 155. In performing the detection process, detector circuit 170 attempts to correct any errors in the received data input.

Detected output 155 is provided to a partial response target circuit 160 that creates a partial response output 165 compatible with filtered output 145. Summation circuit 170 subtracts partial response output 165 from filtered output 145 to yield an error value 175. Error value 175 is provided to a loop filter circuit 180 that filters the received input and provides a filtered output 185 to a digital to analog converter circuit 190. Digital to analog converter circuit 190 converts the received input to feedback signal 195.

In operation, the delay from when amplified output 115 is initially provided until a corresponding value for feedback signal 195 is available may too long. This latency can result in performance degradation or in the worst case scenario, inoperability.

Various embodiments of the present invention provide for mitigating low frequency noise, while maintaining acceptable levels of feedback latency to preserve overall loop gain. For example, the low frequency noise may be around (1/1000)T. Such low frequency noise can have an adverse impact on system performance. In some cases, the feedback signal is generated based upon an output from a detector mimicking circuit that provides an output corresponding to that of a detector circuit, but with a substantially reduced latency.

Figure 2A:
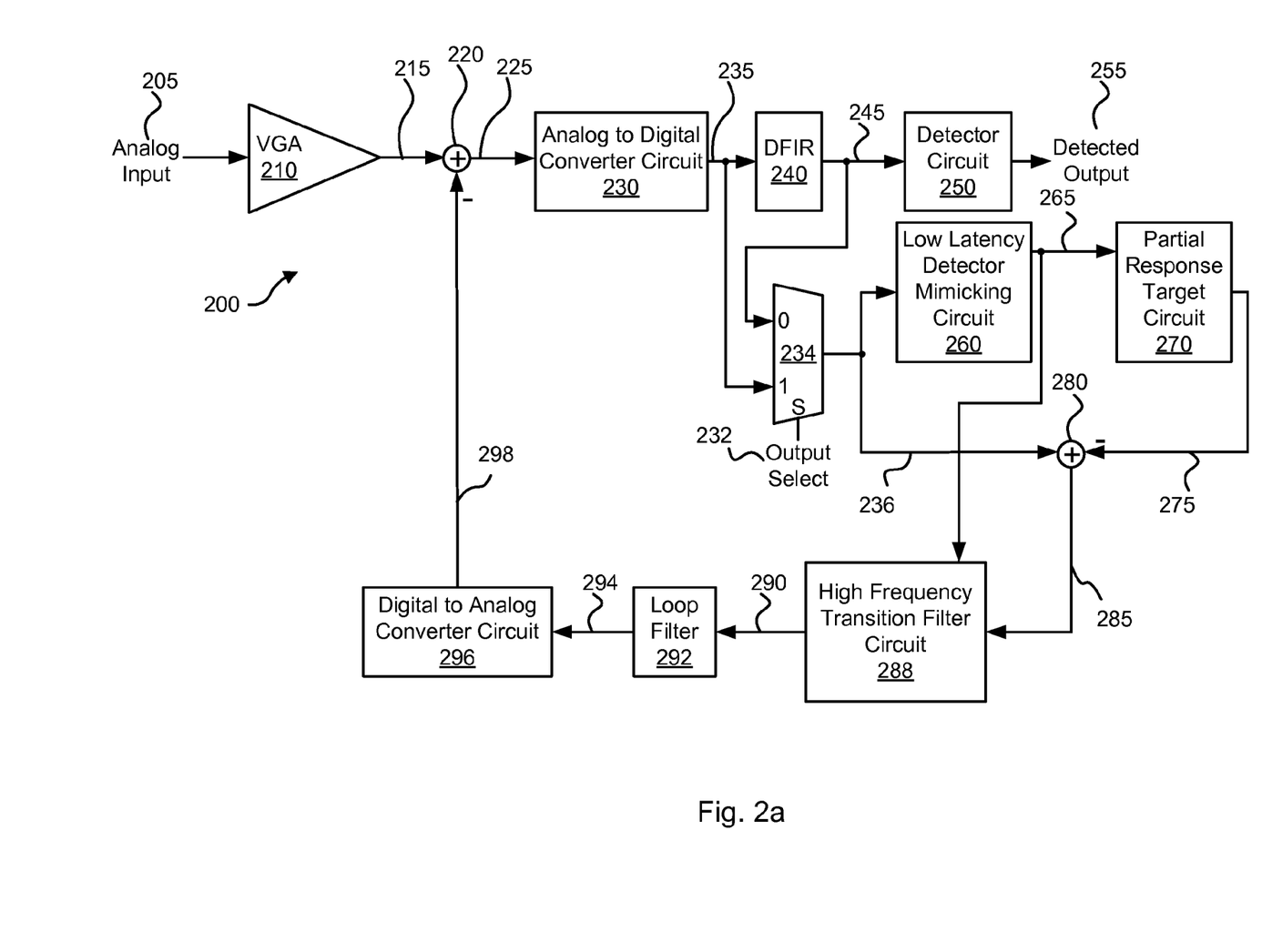
FIG. 2a shows a low latency loop circuit in accordance with one or more embodiments of the present invention.

Turning to FIG. 2a, a low latency loop circuit 200 is shown in accordance with one or more embodiments of the present invention. Low latency loop circuit 200 includes a variable gain amplifier 210 that receives an analog input 205. Variable gain amplifier 210 may be any circuit known in the art that is capable of amplifying a received signal by a gain that can be changed. Based upon the disclosure provided herein, one of ordinary skill in the art will recognize a variety of circuits that may be used to implement variable gain amplifier 210. Analog input 205 may be any analog signal carrying information to be processed. In some embodiments of the present invention, analog input 205 is derived from a storage medium. In other embodiments of the present invention, analog input 205 is derived from a transmission device. Based upon the disclosure provided herein, one of ordinary skill in the art will recognize a variety of analog signals and/or sources thereof that may be used in relation to different embodiments of the present invention. Variable gain amplifier 210 amplifies analog input 205 to yield an amplified output 215 that is provided to a summation circuit 220. Summation circuit 220 subtracts a feedback signal 298 from amplified output 215 to yield a sum 225.

Sum 225 is provided to an analog to digital converter circuit 230. Analog to digital converter circuit 230 may be any circuit known in the art that is capable of converting an analog signal into a series of digital values representing the received analog signal. Analog to digital converter circuit 230 converts the received signal (sum 225) into a series of digital samples 235 that are provided to a digital finite impulse response filter 240. Digital finite impulse response filter 240 may be any circuit known in the art for filtering a digital signal. Digital finite impulse response filter 240 filters the received input (digital samples 235) and provides a corresponding filtered output 245 to a detector circuit 250. Detector circuit 250 may be any detector circuit known in the art including, but not limited to, a Viterbi algorithm detector circuit or a maximum a posteriori detector circuit. Based upon the disclosure provided herein, one of ordinary skill in the art will recognize a variety of detector circuits that may be used in relation to different embodiments of the present invention. Detector circuit 250 performs a data detection process on the received input resulting in a detected output 255. Detected output 255 may be provided to a downstream processor (not shown) that performs additional processing on the output.

In addition, filtered output 245 and digital samples 235 are provided to a selector circuit 234. Selector circuit 234 may be any circuit known in the art that is capable of selecting one or two inputs to be provided as an output signal. In one particular embodiment of the present invention, selector circuit 234 is a multiplexer circuit. Selector circuit 234 provides filtered output 245 as an output signal 236 when an output select input 232 is asserted as a logic '0', and provides digital samples 235 as an output signal 236 when output select input 232 is asserted as a logic '1'. Output select input 232 may be a user programmable input, or may be hardwired to always select one input or the other.

Output signal 236 is provided to a low latency detector mimicking circuit 260. Low latency detector mimicking circuit 260 operates to provide a reasonable approximation of detected output 255 while not requiring the processing time of detector circuit 250. Of note, low latency detector mimicking circuit 260 may not provide the accuracy of detector circuit 255, but the effect of any errors is limited by the feedback loop. Low latency detector mimicking circuit 260 provides a mimicked output 265 to a partial response target circuit 270 that creates a partial response output 275 compatible with output signal 236. A summation circuit 280 subtracts partial response output 275 from output signal 236 to yield an error value 285. Error value 285 is provided to a high frequency transition filter circuit 288. High frequency transition filter circuit 288 operates to set an output 290 equal to zero whenever high frequency transitions within mimicked output 265 are occurring, or equal to error value 285 at all other times. Error value 285 is thus effectively blocked from being included in the loop operation whenever mimicked output 265 is switching rapidly. When mimicked output 265 is switching at a relatively high frequency, it is likely that there are a large number of errors in the input data stream and that the output of low latency detector mimicking circuit 260 (i.e., mimicked output 265) is full of errors and largely unreliable.

Output 290 is provided to a loop filter circuit 292 that filters the received input and provides a filtered output 294 to a digital to analog converter circuit 296. Digital to analog converter circuit 296 converts the received input to feedback signal 298. In operation, the delay from when amplified output 225 is initially provided until a corresponding value for feedback signal 298 is substantially less than the latency incurred when detected output 255 is used to form the error feedback signal. This reduction in latency allows for maintaining a desired level of loop gain.

Figure 2B:
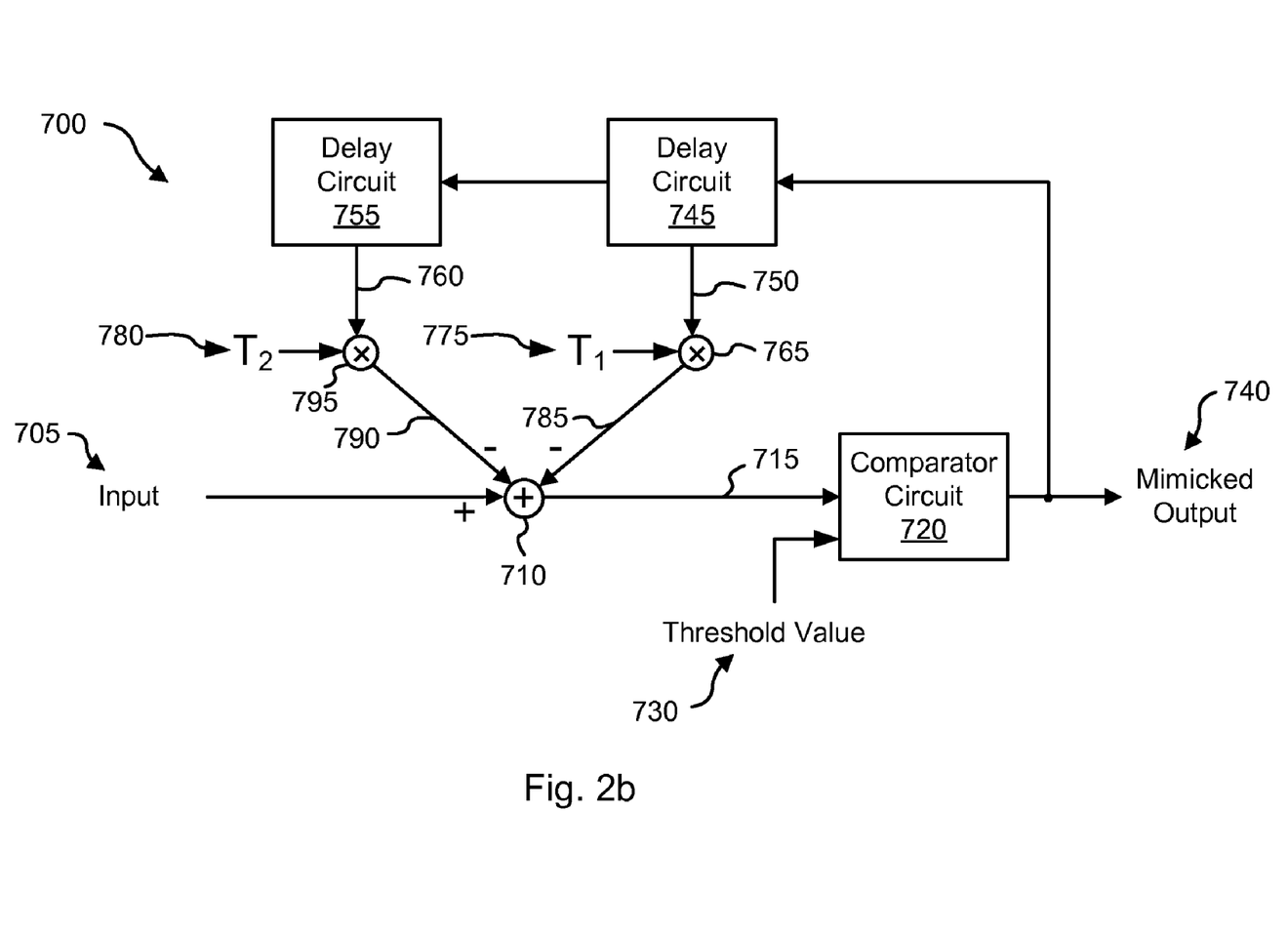
FIG. 2b depicts a detector mimicking circuit that may be used in relation to the low latency loop circuit of FIG. 2a in accordance with some embodiments of the present invention.

Turning to FIG. 2b, a detector mimicking circuit 700 is depicted that may be used in place of low latency detector mimicking circuit 260 of FIG. 2a in accordance with some embodiments of the present invention. Detector mimicking circuit 700 includes a summation circuit 710 that receives an input signal 705. Input signal 705 may be provided either as sum 225 or digital samples 235 depending upon the particular implementation. Summation circuit 710 subtracts an interference value 790 and an interference value 785 from input 705 to yield a sum 715. Sum 715 is provided to a comparator circuit 720 where it is compared with a threshold value 730. In some cases, threshold value 730 is a hardwired value of zero. Comparator circuit 720 provides a '+1' as a mimicked output 740 when sum 715 is greater than or equal to threshold value 730, and provides a '−1' as a mimicked output 740 when sum 715 is less than threshold value 730. Thus, comparator circuit 720 operates to "slice" the received input into a series of either '+1s' or '−1s'.

Mimicked output 740 is provided as an output, and also fed back through a first delay circuit 745 and a second delay circuit 755. Two interference coefficients ($T_1$ 780 and $T_2$ 775) corresponding to respective delayed bit periods are multiplied by a respective delayed output. In particular, an interference coefficient 775 corresponds to an amount of interference caused by a bit directly preceding the current bit and is multiplied using a multiplier circuit 765 by a delayed output 750 from delay circuit 745. An interference coefficient 780 corresponds to an amount of interference caused by a bit preceding the current bit by two periods and is multiplied using a multiplier circuit 795 by a delayed output 760 from delay circuit 755. The output of multiplier circuit 765 is provided as interference value 785, and the output of multiplier circuit 795 is provided as interference value 790.

In operation, detector mimicking circuit 700 receives input 705 that is either the input provided to a detector circuit or is a signal from which the input to the detector circuit is derived. Interference (i.e., interference value 785 and interference value 790) corresponding to two bit periods directly preceding the currently processing bit is subtracted from input 705. The resulting sum 715 is then simplified by slicing it into either a '+1' or a '−1' which is provided as mimicked output 740.

Figure 3:
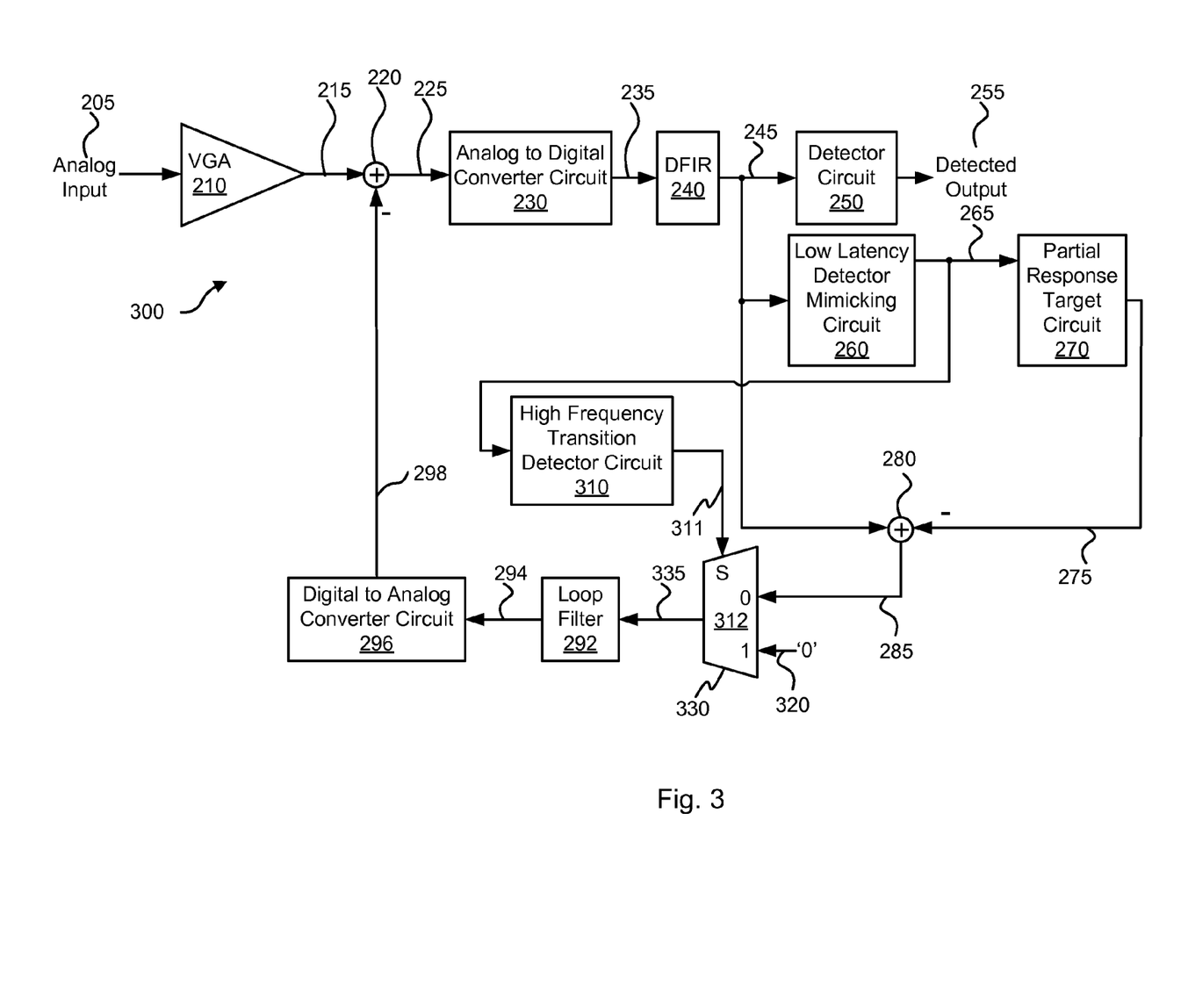
FIG. 3 depicts another low latency loop circuit including a high frequency transition detector circuit in accordance with various embodiments of the present invention.

Turning to FIG. 3, another low latency loop circuit 300 including a high frequency transition detector circuit is shown in accordance with various embodiments of the present invention. Low latency loop circuit 300 includes variable gain amplifier 210 that receives an analog input 205. Variable gain amplifier 210 amplifies analog input 205 to yield amplified output 215 that is provided to summation circuit 220. Summation circuit 220 subtracts feedback signal 298 from amplified output 215 to yield sum 225.

Sum 225 is provided to analog to digital converter circuit 230. Analog to digital converter circuit 230 converts the received signal (sum 225) into a series of digital samples 235 that are provided to digital finite impulse response filter 240. Digital finite impulse response filter 240 filters the received input (digital samples 235) and provides a corresponding filtered output 245 to detector circuit 250. Detector circuit 250 performs a data detection process on the received input resulting in detected output 255. Detected output 255 may be provided to a downstream processor that performs additional processing on the output.

In addition, filtered output 245 is provided to low latency detector mimicking circuit 260. Low latency detector mimicking circuit 260 operates to provide a reasonable approximation of detected output 255 while not requiring the processing time of detector circuit 250. Of note, low latency detector mimicking circuit 260 may not provide the accuracy of detector circuit 255, but the effect of any errors is limited by the feedback loop. Low latency detector mimicking circuit 260 provides mimicked output 265 to a partial response target circuit 270 that creates a partial response output 275 compatible with filtered output 245. Summation circuit 280 subtracts partial response output 275 from filtered output 245 to yield an error value 285. Error value 285 is provided to a multiplexer circuit 312 that provides either a zero value input 320 or error value 285 as a selector output 335 depending upon a selector signal 311 from a high frequency transition detector circuit 310.

High frequency transition detector circuit 310 determines whether a significant number of transitions have occurred over a given length of bits. The following pseudo code represents one implementation of the operation of high frequency transition detector circuit 310.

```
TransitionCount = 0;
For (bit i = 0 to i = SeriesLength + 1)
{
    if (bit[i] ≠ bit[i+1])
    {
        TransitionCount = TransitionCount +1;
    }
    i = i+1
}
If (TransitionCount > Threshold)
{
    Selector signal 311 = '1';
}
Else
{
    Selector signal 311 = '0';
}
```

In the above implementation, the variable SeriesLength indicates the number of the most recent consecutive bits received from low latency detector mimicking circuit 260 that are used to make the determination. In one particular embodiment of the present invention, SeriesLength is six. Based upon the disclosure provided herein, one of ordinary skill in the art will recognize a variety of lengths of bits that can be queried to make the determination in different embodiments of the present invention. The variable Threshold indicates the number of transitions within the investigated bits from low latency detector mimicking circuit 260 that have to switch before error value 285 is replaced by zero value 320. In one particular embodiment of the present invention, the value of Threshold is five. Based upon the disclosure provided herein, one of ordinary skill in the art will recognize a variety of values for Threshold that may be used in relation to different embodiments of the present invention.

Other embodiments of high frequency transition detector circuit 310 compares high frequency patterns with the most recently received bits from low latency detector mimicking circuit 260 to control assertion of selector signal 311. The following pseudo code represents an example of such an implementation of high frequency transition detector circuit 310.

```
If (mimicked output 265 = '-1, 1, -1, 1, -1, 1' OR mimicked output
265 = '1, -1, 1, -1, 1, -1')
{
    Selector signal 311 = '1';
}
Else
{
    Selector signal 311 = '0';
}
```

Based upon the disclosure provided herein one of ordinary skill in the art will recognize other implementations of high frequency transition detector circuit 310 that may be used in relation to different embodiments of the present invention.

Selector output 335 is provided to loop filter circuit 292 that filters the received input and provides a filtered output 294 to a digital to analog converter circuit 296. Digital to analog converter circuit 296 converts the received input to feedback signal 298. In operation, the delay from when amplified output 225 is initially provided until a corresponding value for feedback signal 298 is substantially less than the latency incurred when detected output 255 is used to form the error feedback signal. This reduction in latency allows for maintaining a desired level of loop gain.

Figure 4:
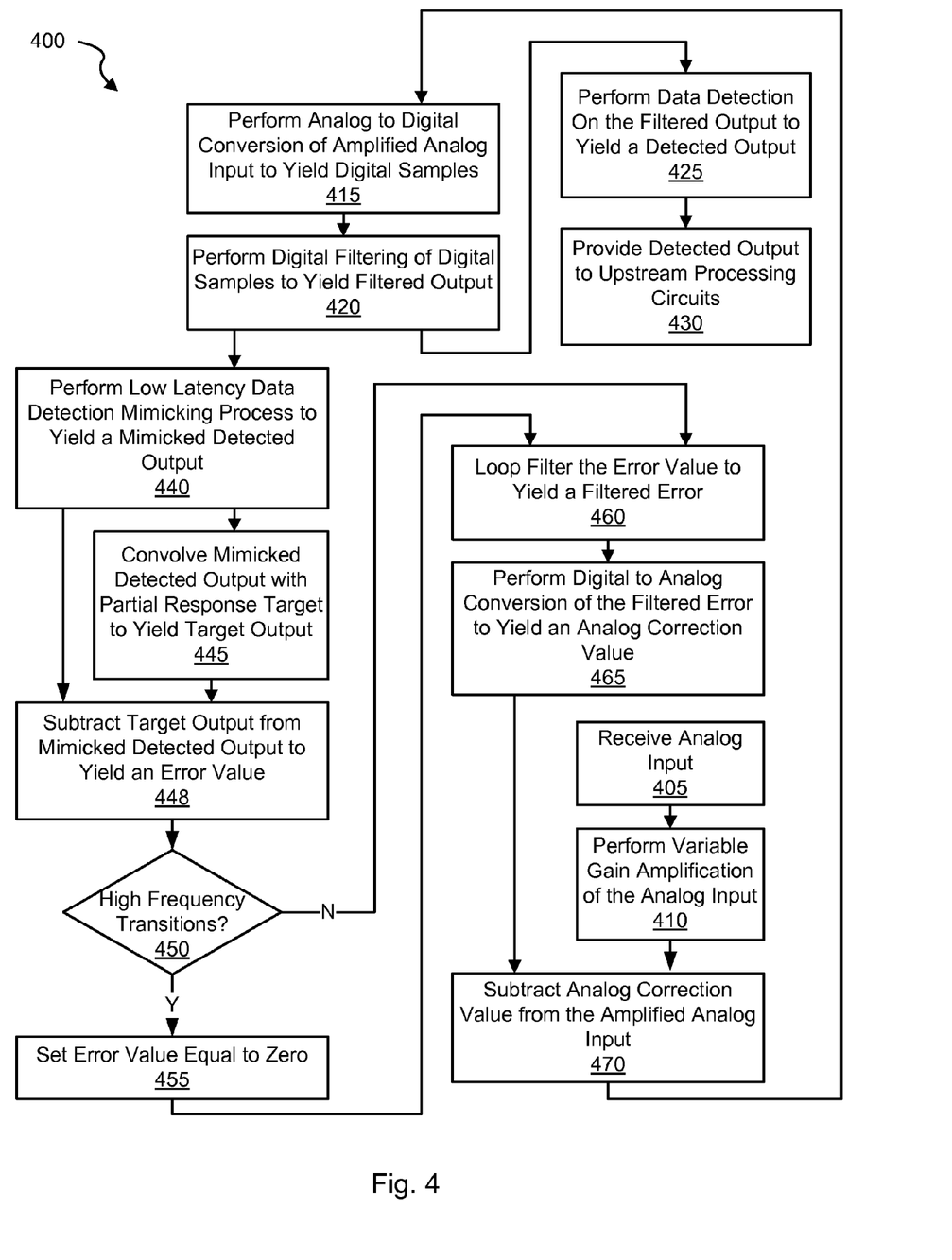
FIG. 4 is a flow diagram showing a method for low latency, low frequency loop processing in accordance with some embodiments of the present invention.

Turning to FIG. 4, a flow diagram 400 shows a method for low latency, low frequency loop processing in accordance with some embodiments of the present invention. Following flow diagram 400, an analog input is received (block 405). The received analog input may be any analog signal carrying information to be processed. In some embodiments of the present invention, the analog input is derived from a storage medium. In other embodiments of the present invention, the analog input is derived from a transmission device. Based upon the disclosure provided herein, one of ordinary skill in the art will recognize a variety of analog signals and/or sources thereof that may be used in relation to different embodiments of the present invention. A variable gain amplification is applied to the received analog input to yield an amplified output (block 410).

An analog correction value (e.g., a feedback value) is subtracted from the amplified analog input to yield a sum (block 470), and an analog to digital conversion is applied to the sum yielding a series of digital samples (block 415). The digital samples are filtered to yield a filtered output (block 420). A data detection process is then applied to the filtered output that yields a detected output (block 425). The data detection process may be any data detection process known in the art including, but not limited to, a maximum a posteriori data detection process or a Viterbi algorithm data detection process. The result of the detection process is provided as a detected output to one or more upstream processing circuits (block 430).

In addition, a low latency data detection mimicking process is applied to the filtered output to yield a mimicked detected output (block 440). The low latency detector mimicking process operates to provide a reasonable approximation of data detection process performed in block 425, but in a shorter period of time. The low latency detector mimicking process may not provide the accuracy of the detection process, but the effect of any errors is limited by the feedback loop.

The mimicked detected output is provided to a partial response target circuit where it is convolved with a target coefficient to yield a target output (block 445). The target output is then subtracted from the mimicked detected output to yield and error value (block 448). It is determined whether the mimicked detected output exhibits a high transition frequency (block 450). Such a determination may be made in accordance with the following pseudo code:

```
TransitionCount = 0;
For (bit i = 0 to i = SeriesLength + 1)
{
    if (bit[i] ≠ bit[i+1])
    {
        TransitionCount = TransitionCount +1;
    }
    i = i+1
}
If (TransitionCount > Threshold)
{
    Selector signal 311 = '1';
}
Else
{
    Selector signal 311 = '0';
}
```

In the above implementation, the variable SeriesLength indicates the number of the most recent consecutive bits provided as the mimicked detected output that are used to make the determination. In one particular embodiment of the present invention, SeriesLength is six. Based upon the disclosure provided herein, one of ordinary skill in the art will recognize a variety of lengths of bits that can be queried to make the determination in different embodiments of the present invention. The variable Threshold indicates the number of transitions within the recent mimicked detected bits that have to switch before the resulting error value is replaced by zero value. In one particular embodiment of the present invention, the value of Threshold is five. Based upon the disclosure provided herein, one of ordinary skill in the art will recognize a variety of values for Threshold that may be used in relation to different embodiments of the present invention.

Other embodiments of the present invention determine high frequency transitions by comparing a recently received set of bits from mimicked detected output with high frequency patterns. An example of such an approach is demonstrated in the pseudo code below:

```
If (mimicked output = '010101' OR mimicked output = '101010')
{
    Provide a Zero Value as the Output;
}
Else
{
    Provide the Error Value as the Output;
}
```

As suggested above, where a high frequency transition is detected (block 450), the previously calculated error value is replaced by a zero value (block 455). The error value is loop filtered to yield a filtered output (block 460), and a digital to analog conversion is applied to the filtered output to yield an analog correction value (block 465).

Figure 5:
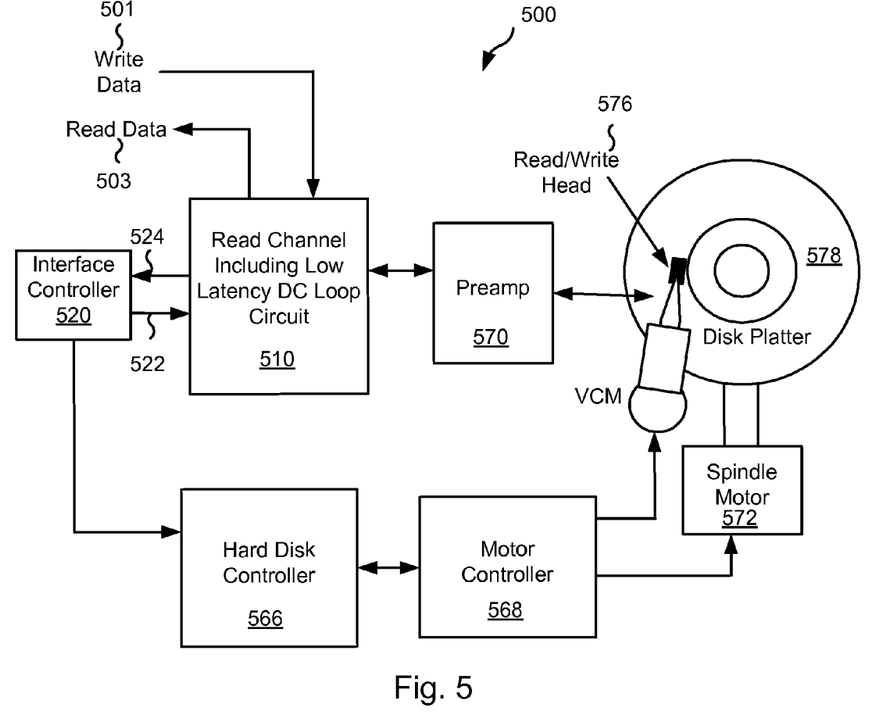
FIG. 5 shows a storage system including a read channel circuit with a low latency, low frequency loop circuit in accordance with some embodiments of the present invention.

FIG. 5 shows a storage system 500 including a read channel circuit 510 with a low latency, low frequency loop circuit in accordance with some embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head assembly 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel circuit 510 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of decoding the received information, read channel circuit 510 processes the received signal using a low latency DC loop circuit. Such a low latency DC loop circuit may be implemented consistent with that described above in relation to FIGS. 2-3. In some cases, the low latency, DC loop processing may be done consistent with the flow diagram discussed above in relation to FIG. 4. A write operation is substantially the opposite of the preceding read operation with write data 701 being provided to read channel circuit 510. This data is then encoded and written to disk platter 578.

It should be noted that storage system 500 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

Figure 6:
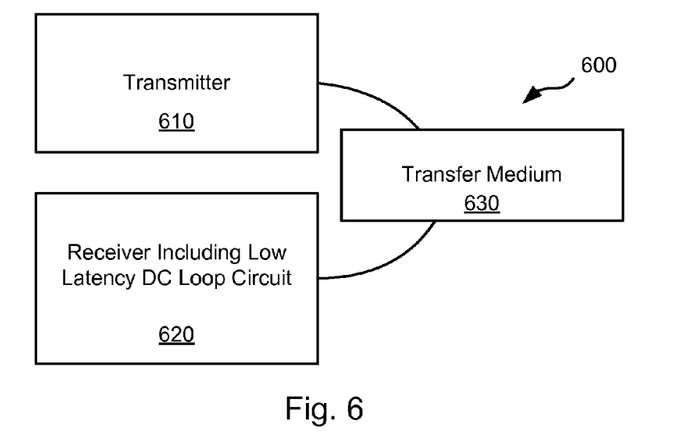
FIG. 6 depicts a wireless communication system including a receiver with a low latency, low frequency loop circuit in accordance with some embodiments of the present invention.

Turning to FIG. 6, a wireless communication system 600 including a receiver with a low latency, low frequency loop circuit is shown in accordance with some embodiments of the present invention. Communication system 600 includes a transmitter 610 that is operable to transmit encoded information via a transfer medium 630 as is known in the art. The encoded data is received from transfer medium 630 by receiver 620. Receiver 620 incorporates a low latency DC loop circuit. Such a low latency DC loop circuit may be implemented consistent with that described above in relation to FIGS. 2-3. In some cases, the low latency, DC loop processing may be done consistent with the flow diagram discussed above in relation to FIG. 4.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, the data processing circuit comprising:
   a data detector circuit operable to perform a data detection process on a first signal derived from a data input to yield a detected output;
   a detector mimicking circuit operable to process a second signal derived from the data input to yield a mimicked output; and
   an error calculation circuit operable to calculate a difference between the second signal and a third signal derived from the mimicked output independent of the detected output to yield a feedback signal, wherein the feedback signal is operable to modify the data input during a subsequent period.

2. The data processing circuit of claim 1, wherein the first signal and the second signal are the same signal.

3. The data processing circuit of claim 1, wherein the circuit further comprises:
   an analog to digital converter circuit operable to convert the data input into a corresponding digital output; and
   a digital filter operable to filter the digital output and provide a filtered output; and
   wherein the first signal is the filtered output, and wherein the second signal is the digital output.

4. The data processing circuit of claim 1, wherein the detector mimicking circuit includes circuitry to mitigate interference evident in a current bit that is related to at least one preceding bit in a bit stream.

5. The data processing circuit of claim 1, wherein the error calculation circuit includes:
   a transition frequency filter circuit operable to reduce the value of the feedback signal when a transition frequency is greater than a threshold.

6. The data processing circuit of claim 5, wherein the value of the feedback signal is reduced to zero.

7. The data processing circuit of claim 1, wherein the error calculation circuit includes:
a transition frequency filter circuit operable to reduce the value of the feedback signal when the mimicked output matches a defined pattern.

8. The data processing circuit of claim 7, wherein the value of the feedback signal is reduced to zero.

9. The data processing circuit of claim 1, wherein the detector mimicking circuit includes:
a summation circuit operable to sum the second signal with an interference value to yield a sum;
a comparator circuit operable to receive the sum and to provide the mimicked output based at least in part on a value of the sum;
a delay circuit operable to delay the sum by a bit period to yield a delayed output; and
a multiplier circuit operable to multiply the delayed output by an interference coefficient corresponding to a preceding bit period to yield the interference value.

10. The data processing circuit of claim 9, wherein the multiplier circuit is a first multiplier circuit, wherein the interference value is a first interference value, wherein the delay circuit is a first delay circuit, wherein the delayed output is a first delayed output, wherein the interference coefficient is a first interference coefficient, wherein the preceding bit period is a first preceding bit period that directly precedes a current bit period, wherein the summation circuit is further operable to sum the second signal and the first interference value with a second interference value, and wherein the detector mimicking circuit further includes:
a second delay circuit operable to delay the first delayed output by a bit period to yield a second delayed output; and
a second multiplier circuit operable to multiply the delayed output by a second interference coefficient corresponding to a second preceding bit period to yield the second interference value.

11. The data processing circuit of claim 1, wherein the data processing circuit is implemented as part of an integrated circuit.

12. The data processing circuit of claim 1, wherein the data processing circuit is implemented as part of device selected from a group consisting of: a storage device, and a communication device.

13. A method for lowering feedback latency in a low frequency data detection circuit, the method comprising:
providing a data detector circuit;
providing a detector mimicking circuit;
receiving a data input;
performing a data detection process using the data detector circuit on a first signal derived from the data input to yield a detected output;
performing a detector mimicking process using the detector mimicking circuit on a second signal derived from the data input to yield a mimicked output;
calculating an error value as a difference between the second signal and a third signal derived from the mimicked output independent of the detected output;
generating a feedback signal based at least in part on the error value; and
applying the feedback signal to modify the data input.

14. The method of claim 13, wherein the first signal and the second signal are the same signal.

15. The method of claim 13, wherein the method further comprises:
performing an analog to digital conversion on the data input to yield a digital output; and
performing a digital filtering of the digital output to yield a filtered output; and
wherein the first signal is the filtered output, and wherein the second signal is the digital output.

16. The method of claim 13, wherein performing the detector mimicking process includes:
reducing interference evident in a current bit that is related to at least one preceding bit in a bit stream.

17. The method of claim 13, wherein the method further comprises:
determining that a high frequency of transitions is evident in the mitigated output; and
based at least in part on determining that a high frequency of transitions is evident in the mitigated output, reducing the error value.

18. The method of claim 17, wherein reducing the error value includes setting the error value to zero.

19. The method of claim 17, wherein determining that a high frequency of transitions is evident in the mimicked output includes comparing the mimicked output to a known pattern.

20. The method of claim 17, wherein determining that a high frequency of transitions is evident in the mimicked output includes counting the number of transitions in a sequence of bits provided as the mimicked output.

21. A storage system, the storage system comprising:
a storage medium maintaining a data set;
a read/write head assembly operable to sense the data set on the storage medium and to provide an analog output corresponding to the data set;
an amplifier circuit operable to amplify the analog output to yield a data input;
a data detector circuit operable to perform a data detection process on a first signal derived from a data input to yield a detected output;
a detector mimicking circuit operable to process a second signal derived from the data input to yield a mimicked output; and
an error calculation circuit operable to calculate a difference between the second signal and a third signal derived from the mimicked output independent of the detected output to yield a feedback signal, wherein the feedback signal is operable to modify the data input during a subsequent period.

22. The storage system of claim 21, wherein:
the error calculation circuit includes a transition frequency filter circuit operable to reduce the value of the feedback signal when a defined transition frequency is achieved; and
the detector mimicking circuit includes:
a summation circuit operable to sum the second signal with an interference value to yield a sum;
a comparator circuit operable to receive the sum and to provide the mimicked output based at least in part on a value of the sum;
a delay circuit operable to delay the sum by a bit period to yield a delayed output; and
a multiplier circuit operable to multiply the delayed output by an interference coefficient corresponding to a preceding bit period to yield the interference value.

* * * * *